United States Patent
Schletti et al.

(10) Patent No.: US 7,743,523 B2
(45) Date of Patent: Jun. 29, 2010

(54) ARRANGEMENT FOR DETERMINING THICKNESSES AND THICKNESS VARIATIONS

(75) Inventors: Reto Schletti, Burgdorf (CH); Jevgenij Mannhart, Cham (CH)

(73) Assignee: BEB Industrie-Elektronik AG, Oberbung (CH)

( * ) Notice: Subject to any disclaimer, the term of this patent is extended or adjusted under 35 U.S.C. 154(b) by 128 days.

(21) Appl. No.: 11/919,956

(22) PCT Filed: May 5, 2006

(86) PCT No.: PCT/EP2006/004232

§ 371 (c)(1),
(2), (4) Date: Nov. 5, 2007

(87) PCT Pub. No.: WO2006/119926

PCT Pub. Date: Nov. 16, 2006

(65) Prior Publication Data

US 2008/0189968 A1 Aug. 14, 2008

(30) Foreign Application Priority Data

May 6, 2005 (EP) .................................. 05405340

(51) Int. Cl.
*G01B 7/06* (2006.01)
*B65H 7/02* (2006.01)
(52) U.S. Cl. .................. 33/501.03; 33/501.04
(58) Field of Classification Search ................. 33/501.4, 33/501.03

See application file for complete search history.

(56) References Cited

U.S. PATENT DOCUMENTS

| 4,271,699 | A | * | 6/1981 | Williamson | ................... 73/159 |
| 4,729,556 | A | | 3/1988 | Fujii et al. | |
| 5,226,239 | A | * | 7/1993 | Boissevain et al. | ........ 33/501.02 |
| 5,727,692 | A | * | 3/1998 | Large et al. | ................. 209/603 |
| 6,360,447 | B1 | * | 3/2002 | Foley | ....................... 33/501.02 |
| 6,711,828 | B2 | * | 3/2004 | McCune et al. | ................ 33/533 |
| 6,782,986 | B2 | * | 8/2004 | Toda et al. | ................... 194/206 |
| 7,131,211 | B2 | * | 11/2006 | Kirstine | ....................... 33/552 |
| 7,392,743 | B2 | * | 7/2008 | Kawaguchi et al. | ......... 101/232 |
| 2002/0110396 | A1 | | 8/2002 | Ueoka | |
| 2003/0141653 | A1 | | 7/2003 | Kumamoto et al. | |
| 2009/0001661 | A1 | * | 1/2009 | Klein et al. | ............ 271/258.01 |

FOREIGN PATENT DOCUMENTS

WO    WO 92/11505  A    9/1992

\* cited by examiner

*Primary Examiner*—Christopher W Fulton
(74) *Attorney, Agent, or Firm*—Orum & Roth LLC

(57) ABSTRACT

The device claimed by the invention is characterized essentially in that during the transport of a flat object, in particular, a banknote, through guide elements the deflection of one or two second guide elements from a first guide element is detected via an electrically conductive element by one or more flat air core coils. In the process a magnetic alternating field is generated which is influenced by a change of position of the electrically conductive element. The alternating field causes eddy currents in the electrically conductive element. These eddy currents in turn influence the alternating field. When the flat coils are each a part of an LC oscillating circuit, for example, the resonance frequency and the attenuation of this oscillating circuit are influenced. At a constant excitation frequency the amplitude of the oscillations varies.

13 Claims, 4 Drawing Sheets

ARRANGEMENT FOR DETERMINING THICKNESSES AND THICKNESS VARIATIONS

The invention relates to the processing of flat objects or documents, in particular, paper currency or documents such as banknotes, checks, share certificates, paper with security imprint, documents, admission tickets or travel tickets, certificates, credit cards or ATM cards and/or identification and access cards. The invention relates in particular to a device for the measurement of the thickness or to the determination of a variation in the thickness of an object and an apparatus which is equipped with such a device. In apparatus used for the processing of banknotes and checks, such devices are often used in the form of tape sensors and thus as devices used to determine whether a banknote and/or check bears a tape strip and thus, for example, can no longer be placed in circulation. An additional possible use is that of identifying multiple insertions.

"Processing" means here all procedures to which objects resembling banknotes may be subjected, thus, for example, reading, identifying, checking, verifying, checking, counting, sorting (out), transporting and/or stacking etc.

A device for determining a variation in thickness due to the presence of a tape strip must, on the one hand—because of the low thickness of the tape strips that are available—detect at relatively high resolution variations in thickness. At the same time it is also desirable to achieve a lateral resolution, for example to differentiate a variation in thickness due to the presence of a tape strip from such a variation that is attributable to the presence of simultaneously inserted banknotes.

The prior art describes objects resembling banknotes being transported between rollers, which are pressed together by spring action, whereby one of which is moveable in relationship to the other. In this approach the amount of deflection of the rollers from one another provides a measure of the thickness of the object being transported between them.

The object of the invention is to create a device for determining the thickness and variations in the thickness of flat objects, in particular banknotes, which is sufficiently sensitive to detect variations in thickness due to tape strips as well. The device should have a simple design and be able to be manufactured at the lowest possible cost. In addition, it will preferably make it possible to determine variations in the thickness of a flat object at least partially with a lateral resolution across the entire width of the object.

The object is achieved by a device as described in the patent claims. An additional object of the invention is a mechanism that is equipped with a tape or multiple insertion sensor designed as such a device.

The device claimed by the invention is characterized essentially in that, in the presence of a flat object, the deflection of one or more second guide elements from a facing first guide element is detected via an electrically conductive element by means of at least one flat air-core coil, which generates a magnetic alternating field that can be influenced by an electrically conductive element. The deflection of the second guide elements is induced by the presence of the flat object between the guide elements. The deflection will be increased whenever instead of one object two or more objects are present between the guide elements, or whenever the thickness of the object varies. Such variation in thickness can, for example, be produced by a tape strip that has been added to the object. The alternating field produces eddy currents in the electrically conductive, therefore usually metallic but not ferromagnetic, material of the conductive element. These eddy currents in turn influence the alternating field. When, in one advantageous configuration of the invention, the flat coils that are used are part of an LC oscillating circuit, the resonance frequency and the attenuation of this oscillating circuit are influenced. While the excitation frequency is kept constant, the amplitude of the oscillations varies.

The second guide elements are preferably located along a line that runs perpendicular to the direction in which the objects are being transported.

The guide elements are preferably conveyor rollers.

The device may be realized such that a deflection of the guide elements from one another produces a displacement of the electrically conductive element(s) along a plane defined by the flat coil. In such a case the overlap between the one or the two or more flat coils and the electrically conductive element will be altered by the deflection. The geometry and the arrangement of the coils and the electrically conductive element are such that, for example, the overlap of one coil increases as a function of the deflection of a guide element. Alternatively or additionally, a movement of the electrically conductive element along a direction that is perpendicular to the plane of the flat coil can be produced. The attenuation characteristics of the LC oscillating circuit are very sensitive and depend to a great extent on the distance of an electrically conductive element from its related flat coil.

An electrically conductive element which is made of a material that is able to conduct electricity, can—by the deflection of a guide element, for example, via an appropriately designed transmission means that can act as a lever—be moved relative to the flat coil such as (a) the distance, (b) the degree of overlap, or (c) the distance and the overlap of the coil changes. In the latter case the coils and the electrically conductive element are preferably arranged such that the overlap of a coil increases as the distance decreases.

In one advantageous embodiment of the invention a transmission means that acts as a lever is designed and located such that the deflection of the guide element is multiplied, which in turn increases the sensitivity of the measurement.

The distance between an electrically conductive element and a flat coil is specified such that the alternating field is sufficiently sensitive. For example, the distance should be not more than 7 mm, preferably not more than 5 mm, and particularly preferably not more than 3 mm.

In one advantageous embodiment of the invention a flat coil is formed by conductor paths of a printed circuit, which is very economical. It is preferably located on a printed circuit board. The excitation and evaluation circuitry for the flat coil can be located on the same printed circuit board, which is also very advantageous from the standpoint of manufacturing efficiency. It is very simple to mount an electrically conductive, in particular metallic material in or on the two guide elements or—what is often more practical—on a transmission means that is connected to the two guide elements. For example, the two guide elements or the transmission means can be made entirely of metal, a metal element, for example, in the form of a metal plate, can be fastened to the transmission means, or the transmission means can have a section made of an electrically conductive material in a peripheral area. The material can be attached in any desired way or it can be vapor deposited, etc.

In one preferred embodiment, two or more first guide elements are arranged next to one another and together with one second element each they form a pair of elements. The row of pairs preferably runs crosswise to the direction in which the flat objects are conveyed. In addition, two or more first guide elements can be provided, whereby in each case two or more second guide elements can be associated with one first guide element.

In order to control and evaluate several air core coils and thus to be able to design the construction of the device as simply and advantageously as possible, preferably only one detector, under some circumstances a synchronous detector, will be used. For this purpose the signals from the air core coils are fed via a multiplex unit.

In a preferred embodiment of the invention at least two flat coils are associated with an element made of an electrically conductive material. Thus two flat coils lie side by side and are qualitatively adversely dependent upon their width, thus upon the lateral expansion from the position along the direction of movement of the conductive material. A differential signal from the two flat coils is used for the measurement. For example, two delta coils that are equal in size can be arranged side by side and together form a rectangle.

A single flat coil can also consist of two or more partial coils that are not mounted in the same plane, but are instead, for example, formed on the front and back side of a printed circuit board.

According to yet another advantageous embodiment of the invention the flat coils are in a circuit such that an LC oscillating circuit is formed from one flat coil and one capacitative element and possibly additional elements. Preferably the oscillating circuit will not be excited at resonance, but rather along one flank, for example, the leading low frequency flank, for example at a frequency of a maximum 98% or a maximum 95% of the resonance frequency. The ideal excitation frequency is a function of the factor Q.

In one preferred embodiment the level of excitation frequency of the flat coil is such that the product of the frequency and the inductance of the coil is much greater than the ohmic resistance. The imaginary component of the complex impedance of the coil is then much greater than the real component, for example, at least 100 times greater. In contrast to the ohmic resistance the inductance is dependent only upon the geometry and it is thus independent of the temperature. Accordingly, the entire measurement methodology is independent of the temperature. If then in addition the measurement is made at selected frequencies, complete independence from all outside influences is achieved. In one particularly preferred embodiment the excitation frequency is between 1 MHz and 10 MHz.

Below, examples of embodiments of the invention are described in greater detail with reference to the accompanying schematic diagrams. In the figures.

Figure 1:
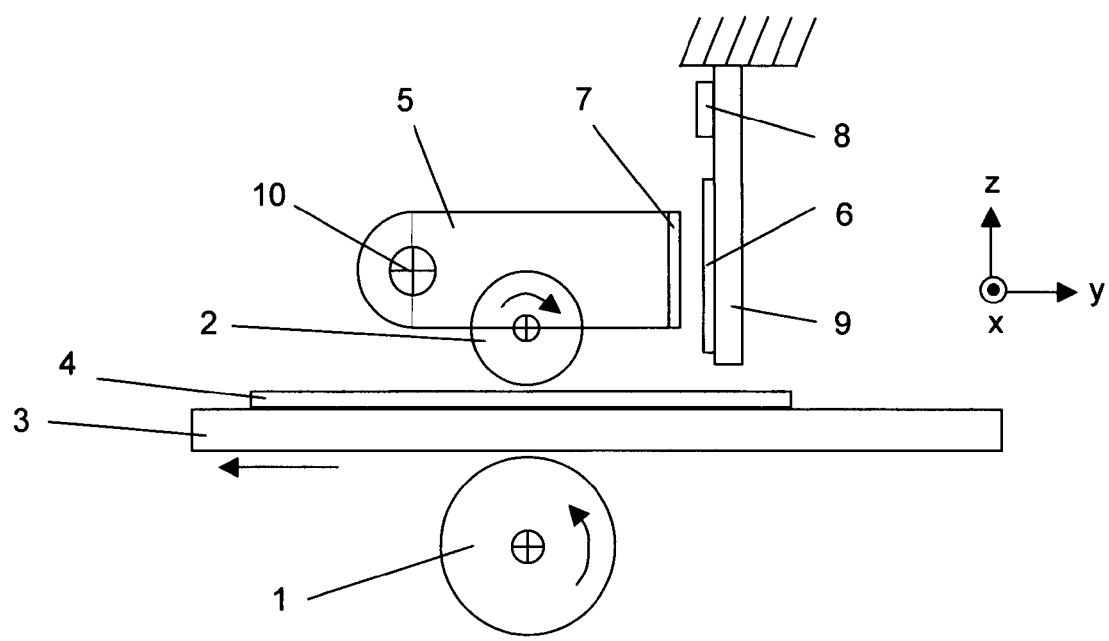
FIG. 1 shows a side view of a first example of an embodiment of the inventive device.

In the device shown in FIG. 1 a flat object 3, for example a banknote, is transported between a first guide element 1 and a second guide element 2. The first guide element 1 is a conveying roller, which extends across the full width of the device. In addition to the second guide element 2 there are additional guide elements that are aligned across the full width of the device, but are not visible in the drawing. The second guide elements 2 are movably mounted such that they can be deflected away from the first guide element 1, in this case in the z direction, as soon as the flat object passes between the guide element in the y direction. The second guide elements 2 are deflected further when the thickness of the banknote changes. Such a variation in thickness can be, as shown in FIG. 1, caused by a piece of tape strip 4 that has been affixed to the banknote. Because the tape strip 4 does not extend across the full width of the banknote, not all but only some of the second guide elements 2 are deflected by the tape strip 4. The deflections of each of the second guide elements 2 are transformed via a transmission means 5, one of which is coupled to each of the guide elements 2 and serves simultaneously as the mounting for the guide elements 2, into a movement relative to a surface of a printed circuit board 9 and thus relative to several flat coils 6 that are formed by conduction paths on the surface of the printed circuit board. One flat coil is thereby associated with each second guide element 2. When one second guide element is deflected, the corresponding transmission means 5 moves around a pivot pin 10, which defines a point of reference. The transmission means 5 has an electrically conductive element 7, for example, a small metal plate that is attached to the transmission means, which is mounted such that it faces the flat coil 6. Alternatively, the transmission means can itself be made entirely or partly of metal.

The flat coil 6 does not have a ferromagnetic core and thus it operates as an air core coil.

In FIG. 1 only a single second guide element 2, a corresponding transmission means 5 and one associated flat coil are visible. In the direction of view provided by FIG. 1 two or more units, each of which consists of a second guide element, a transmission means containing an electrically conductive element, and a flat coil, are arranged one behind the other. The first guide element is aligned perpendicular to the direction of transport of the object 3. The second guide elements 2 are aligned in a row next to one another perpendicular to the direction of transport. This alignment allows a certain amount—corresponding to the distance between each two second guide elements 2—of lateral resolution, i.e., a resolution in the x direction. Such a resolution is necessary in order to differentiate a banknote that has a tape strip that lies along the entire length in the y direction or tape strips that are on two banknotes one of which is lying on top of the other. A resolution in the other directions (y) is achieved in that while the object is being transported between the conveying rollers that act as guide elements 1 and 2, a measurement is taken by means of elapsed time resolution.

In the embodiment shown in the figure the electrically conductive element 7 is moved essentially parallel to the flat coil by means of a movement of the transmission means 5. The flat coil is aligned such that its overlap (that part of the surface of the flat coil which is located opposite the metal component) is varied by the movement of the element.

Under operating conditions, each flat coil is excited by means of an AC voltage such that it emits an alternating magnetic field. The frequency is between 1 MHz and 10 MHz. Because the electrically conductive component 7 is located within the range of influence of the alternating field, eddy currents are generated in the fields which, in turn, influence the alternating field and thus also the impedance of the flat coil 6. The smaller the distance between the flat coil and the electrically conductive element and the larger the overlap, i.e., that part of the flat coil's surface which faces the component, the greater is the influence The principle of operation of the flat coil in conjunction with the electrically conductive component corresponds to that of a transformer, whereby the flat coil corresponds to the primary winding and the eddy currents in the component produce the effect of the secondary winding.

The flat coils 5 can be in the shape of a spiral or they can consist of concentric elements, whereby if concentric elements are used, the power is supplied via feed-throughs from inside the printed circuit board or from the reverse side. Also located on the printed circuit board is a supply and electronic evaluation circuit 8 that is shown only schematically. The distance between the surface of the electrically conductive component 7 and the printed circuit board 9 can be a maximum of 7 mm, for example, but is preferably less than 5 mm, and often less than 3 mm, and optimally at the maximum about 2 mm.

The metal element will preferably be highly electrically conductive. It can be made primarily of aluminum, for example. The electrically conductive material is not ferromagnetic, but rather paramagnetic or diamagnetic in order to prevent hysteresis to the greatest possible extent.

Figure 2:
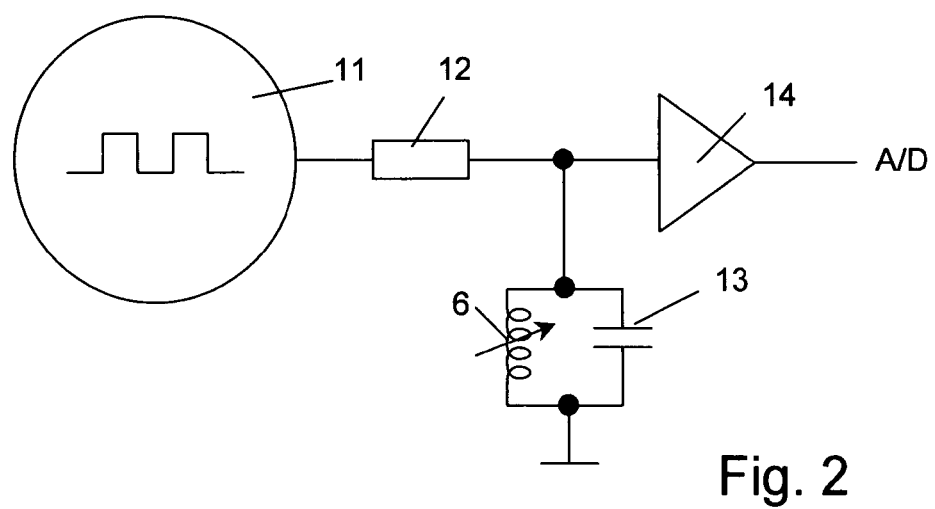
FIG. 2 shows a simplified circuit diagram for a flat coil.

FIG. 2 shows very schematically how a flat coil 6 is integrated into the electronic circuit. An AC generator 11—in the example shown in the drawing it is generating a square wave—energizes via a resistor 12 an LC oscillating circuit that consists of the flat coil 6 and at least one capacitor 13. The response signal that is taken from an integrated amplifier 14 is proportional to the amplitude of the oscillation, which for its part is a function of the impedance of the flat coil 6. If the signal is processed digitally, an analog-digital converter A/D will, as is the case in the following embodiments, be located downstream of the amplifier 14.

Figure 3:
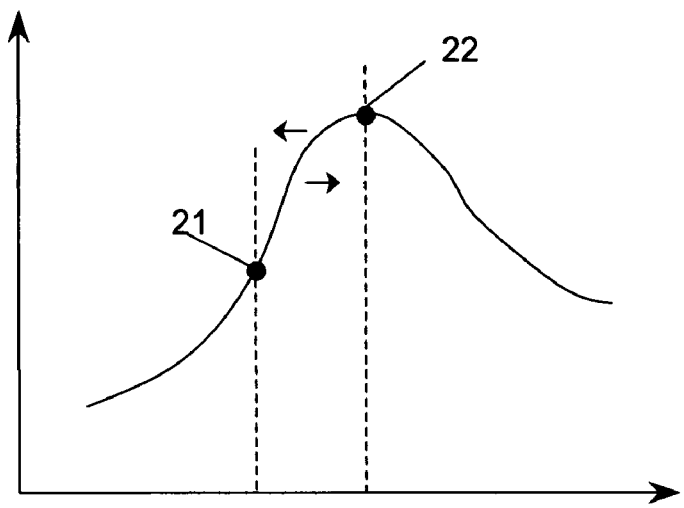
FIG. 3 shows a graphic representation of a resonance curve of the LC oscillating circuit.

Preferably, as depicted in FIG. 3, by the use of a signal from a single flat coil, the oscillating circuit is not—as is usually the case in distance measuring equipment—driven at resonance, but instead along the leading lower frequency flank, for example. In FIG. 3 a preferred operating point 21 and the resonance point 22 are highlighted. The fact that the amplitude A is a function of the shifting of the resonance curve caused by a change in the impedance is clearly more pronounced at the operating point 21 than at the resonance point 22. In the drawing the operating point is shown at a particularly steep point on the leading flank in the vicinity of the resonance point 22, but in principle the operating point can lie anywhere along the flank.

Figure 4:
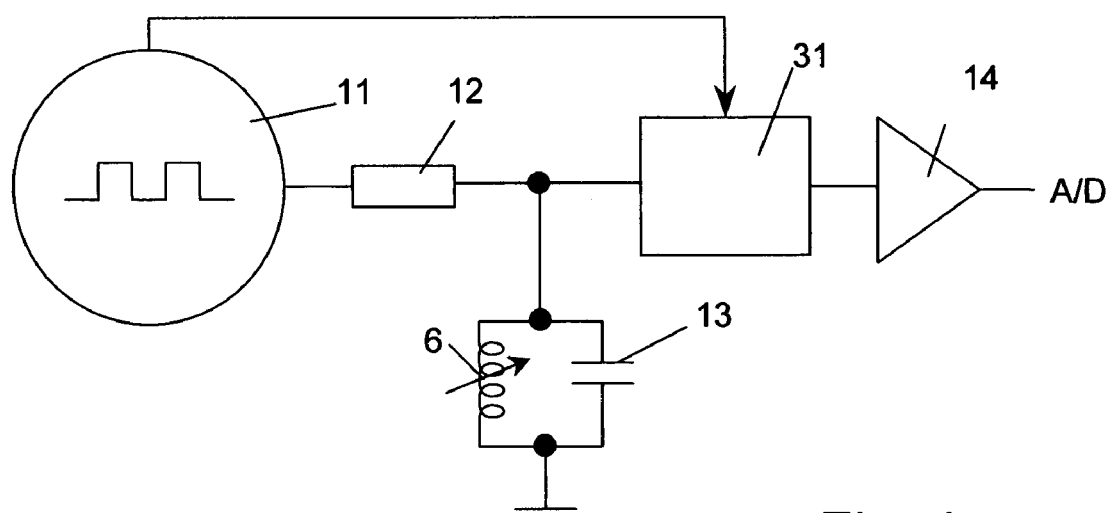
FIG. 4 shows a likewise greatly simplified schematic that includes a synchronous detector.

Both the measuring sensitivity of the arrangement and the insensitivity to interference can be increased if the signal evaluation is frequency selective. FIG. 4 shows schematically a synchronous detector 31, for which the excitation signal is used as its control signal. Because it is well known how synchronous detectors operate, no further explanations are provided here.

Figure 5:
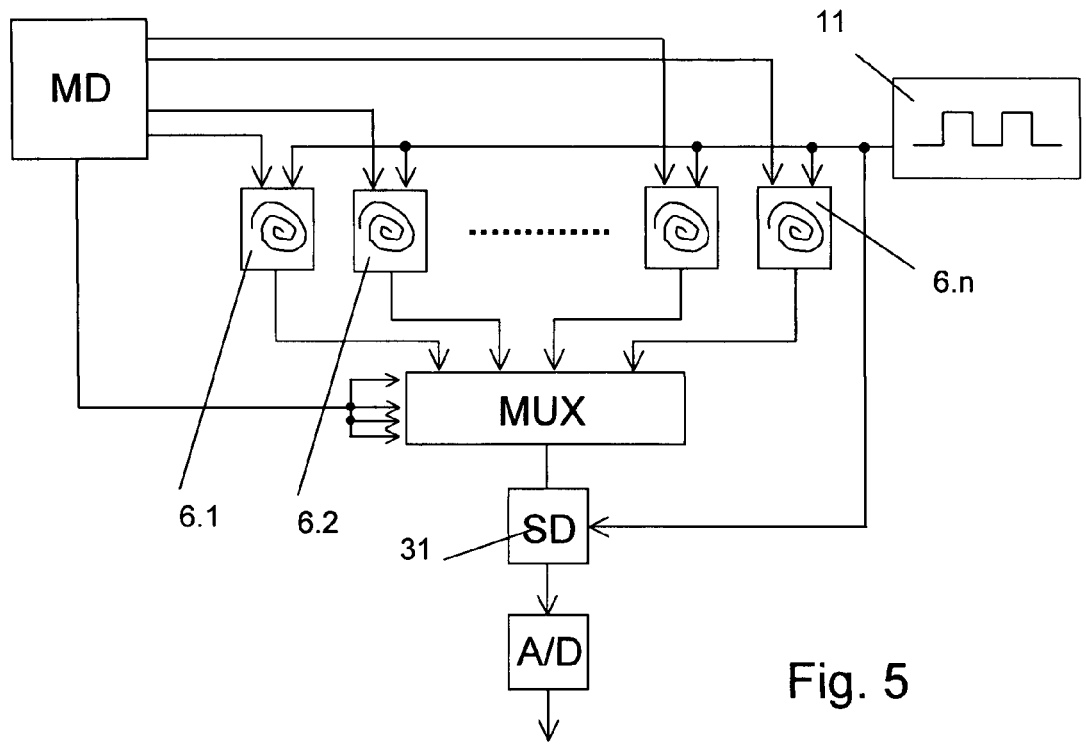
FIG. 5 shows a circuit diagram for driving the device in a multiplex procedure.

FIG. 5 shows a schematic circuit diagram of several flat coils 6.1 through 6.n, which are independent from one another and are arranged one next to the other. The coils are energized by means of the AC generator 11. The response signals of the coils are fed to a multiplex unit MUX and from there to a synchronous detector 31. Subsequently the analog signals are converted in an analog-digital converter A/D to digital signals for further use. It is also possible to leave the multiplex unit out, in which case a separate detector is required for each coil.

The multiplex unit functions as a time division multiplexer, whereby all of the flat coils are energized simultaneously and have approximately the same resonance frequency. The multiplex frequency $f_m$ is selected such that it is much lower than the period required for an item similar to a negotiable instrument to pass through the guide elements. Typically $f_m$ is between 1 kHz and 100 kHz. The multiplex unit MUX is controlled by a control unit MD. If necessary the coils may also be activated by multiplexing, which is indicated in the drawing by the arrows leading from the control unit to the coils. This is, for example, advantageous whenever the coils would otherwise disturb one another during simultaneous operation.

Alternatively, operation with only one synchronous detector without a time division multiplexer would also be feasible, if the individual coils have a relatively steep resonance curve. In such case the excitation frequency of the AC generator would be periodically changed and in each period each of the coils 6.1 through 6.n would be energized. The frequency $f_{mod}$ of the energizing frequency modulation is also selected such that it is much lower than energizing frequency itself, but such that the period $1/f_{mod}$ is significantly less than the time required for an item similar to a banknote to pass between the guide elements. Typically, $f_{mod}$ is between 1 kHz and 100 kHz. It is also conceivable that the multiplex configuration shown in FIG. 5 could be used without a synchronous detector.

Figure 6:
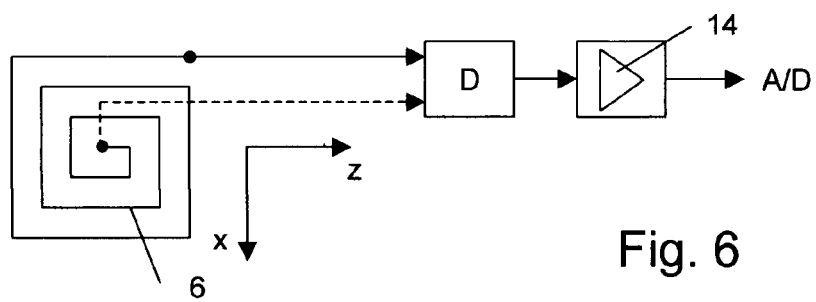
FIG. 6 shows the principle of operation of a configuration containing a single flat coil per second guide element.

FIG. 6 shows another possible design for the flat coil 6, which in this case is rectangular in shape and runs spirally. Contrary to the embodiments described above this embodiment provides for an amplitude detector D that is not necessarily frequency selective and which is followed by an amplifier and an analog-digital converter.

Figure 7:
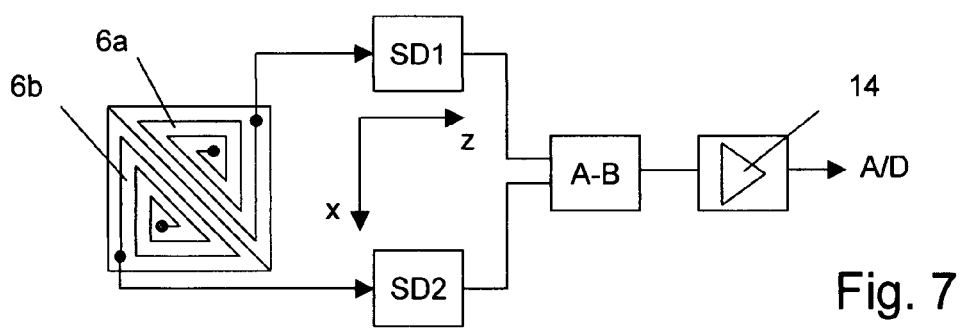
FIG. 7 shows the principle of operation of a configuration containing two delta coils.

FIG. 7 depicts a version in which rather than a single flat coil two flat coils are used, which are in a flat coil arrangement with an inverse dependence of the width (lateral direction), of the dimension in the x-direction, on the deflection direction of the electrically conductive elements. FIG. 7 shows the integration into the electronic circuit of two delta flat coils 6a and 6b that are equal in size and together form a rectangle. From the signals SD1 and SD 2 which are emitted from the two LC oscillating circuits working with coils 6a and 6b, a differential signal A-B is formed. The drawing shows an amplifier 14 downstream of the differential signal formation; often, however, alternatively or in addition to the amplification of the differential signal the signals SD1 and SD2 are amplified even before the differential signal is formed, whereby two A/D converters are required.

By means of the differential signal formation the sensitivity of the configuration increases when the cover or covering changes. A pair of flat coils is associated with each second guide element.

Figure 8:
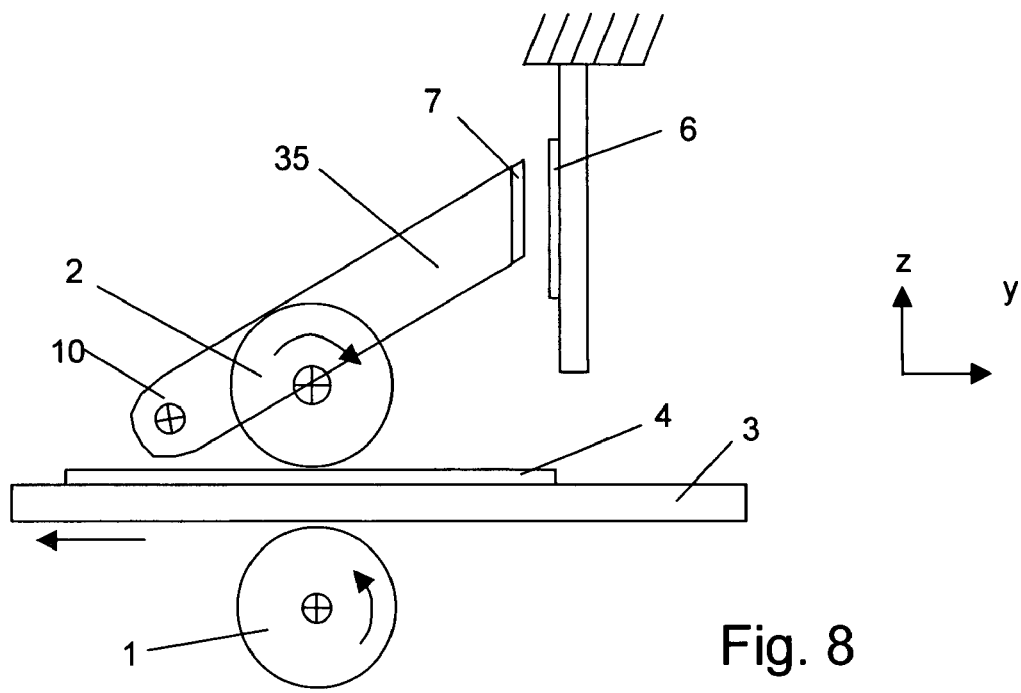
FIG. 8 shows a second example of an embodiment of the invention.
Figure 9:
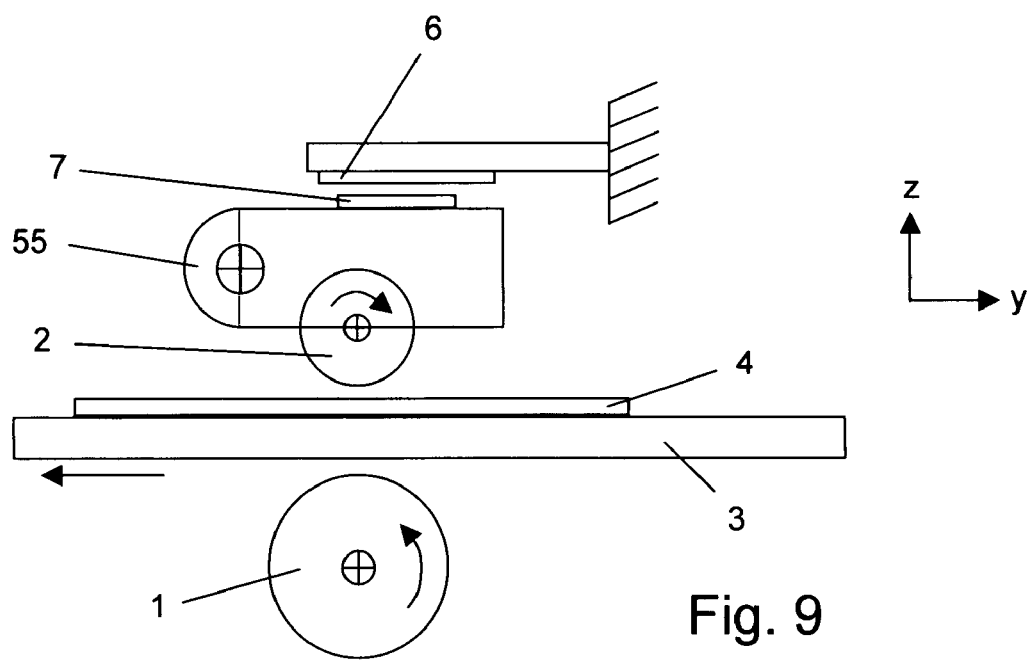
FIG. 9 shows a third example of an embodiment of the invention.

Alternatively or in addition to the configuration shown in FIG. 1, in which—by means of a deflection of a transmission means 5—that part of the surface of the flat coil that is covered by the metal component changes, other configurations are conceivable; they are briefly explained in FIGS. 8 and 9.

FIG. 8 shows an embodiment of the invention in which a transmission element 35 that runs longitudinally along an axis is connected to one of the guide elements 2 such that a deflection of this guide element 2 is reinforced as if by a lever. The transmission means 35 may in this regard be rotated around an axis of rotation that is located at the end opposite to that on which the metal component is affixed. The guide element 2 is positioned with respect to the longitudinal dimension of the transmission means 35 as close as possible to the axis of rotation of the transmission means. By means of a deflection of the guide element 2 the transmission means is moved rotationally away from the flat coil 6. The greater the deflection, the greater the distance between the metallic component 7 and the flat coil 6. The position of the flat coil 6 relative to the conductive component 7 can now be selected such that an overlap of the coil(s) is simultaneously decreased as the distance increases, i.e., resulting in a reduction of the signal. In this way even a very small deflection of a guide element 2 can be translated into a very clear signal, which can be measured, for example, even with a somewhat more simplified and consequently advantageous circuit—possibly one without a synchronous detector.

In the third example of an embodiment shown in FIG. 9, the flat coils 6 function only as distance sensors. The electrically conductive element 7 of a transmission means 55 and the related flat coil 6 are always arranged in planes that run parallel to one another. The distance between these two planes changes as a function of whether and to what degree one of the second guide elements 2 is separated. A change in distance changes the influence of the metallic component 7 upon the alternating field of flat coil 6.

These configurations are merely examples. The principle that a variation in the thickness of the flat object causes a movement of a metal element relative to a flat coil can be realized in many other geometries. An apparatus claimed by the invention for processing objects that are similar to banknotes has at least one device for the execution of process steps on objects resembling banknotes, such as, for example, reading, identifying, controlling, verifying, checking, counting, sorting (out), transporting and or stacking, etc. These or at least one of these devices is a tape sensor which is designed in the form of a device as described above.

The invention claimed is:

1. A device for determining the thickness or a variation in the thickness of a flat object, in particular a banknote, having
    at least a first and a plurality of second guide elements between which the flat object can be conveyed,
    whereby the second guide elements are located opposite the first guide element and whereby the second guide elements are arranged next to one another in a row so that a variation in the thickness of the flat object that is passing between the guide elements causes a deflection in one direction of one or more of the second guide elements from the first guide element,
    a plurality of flat coils, the flat coils being immovable, whereby each flat coil is assigned to a second guide element, and
    a means for energizing the flat coils for generating a magnetic alternating field,
    a plurality of electrically conductive elements, wherein each second guide element is either indirectly or directly rigidly attached to an electrically conductive element and a deflection of a second guide element causes a deflection of the associated electrically conductive element,
    an electronic evaluation circuit to detect the influence of the electrically conductive element upon the magnetic alternating field of the flat coil, whereby the flat coil is in the form of an air core coil.

2. A device as recited in claim 1, wherein the electrically conductive element in the area of the alternating field does not contain any ferromagnetic materials.

3. A device as recited in claim 1, wherein the flat coils and the means of controlling and evaluating the flat coils are formed on a common printed circuit board.

4. A device as recited in claim 1, wherein a plurality of first guide elements are arranged next to one another and each first guide element forms a pair with a second guide element.

5. A device as recited in claim 1, wherein the control and evaluation means contain a multiplex unit (MUX), which is connected with two or more of the flat coils such that signals from two or more of the flat coils can be detected by a single detection unit.

6. A device as recited in claim 1, wherein the control and evaluation means contain a synchronous detector (SD).

7. A device as recited in claim 1, wherein the control and evaluation means of the flat coils have a means of generating a periodic energizing signal, whereby a flat coil and a capacitive element are parts of an LC oscillating circuit, and the means for generating the periodic energizing signal is designed or programmed such that the frequency of the energizing signal is lower than the resonance frequency of the LC oscillating circuit.

8. A device as in claim 1, whereby the second guide elements are mounted on transmission means, and whereby the electrically conductive elements are mounted on the transmission means such that a deflection of one of the second guide elements can be converted via the transmission means into a movement of the associated conductive element relative to the associated flat coil, whereby the transmission means are realized such that a deflection of a second guide element can thereby be converted into a movement of the associated electrically conductive element that is proportionally increased and/or is in a changed direction.

9. A device as recited in claim 1, wherein the electrically conductive elements have a flat surface and during a deflection of one or more of the second guide elements the associated electrically conducting element(s) can be moved parallel to the plane, in which the flat coils are formed, whereby the flat coils extend across a certain surface area and whereby the partial area of this surface that is overlapped by the flat surface changes as a function of the deflection of a second guide element.

10. A device as recited in claim 1, wherein:
    two of the flat coils that are mounted on the same plane are associated with an electrically conductive element,
    the control and evaluation means are realized so that they form a differential signal (A-B) from individual signals coming from the two flat coils,
    in the plane defined by the flat coils a first direction (z) is defined essentially parallel to the deflection of a second guide element and a second direction (x) is defined perpendicular to the first direction,
    and the dimension of the one flat coil in the first direction (z) becomes monotonically greater or monotonically less as a function of the position along the second direction (x),
    and the dimension of the other flat coil in the first direction (z) follows a curve that is qualitatively inverse to that of the first flat coil as a function of the position along the second direction (x).

11. A device as recited in claim 1, wherein the minimal distance between a plane in which one of the flat coils is formed and the associated electrically conductive element is no greater than 7 mm.

12. A device as recited in claim 1, wherein by a deflection of a second guide element from the first guide element the distance between the associated electrically conductible element and the associated flat coil is varied.

13. Apparatus for processing items similar to banknotes with a tape sensor and/or multiple insertion detector that is designed in the form of a device as recited in one of the preceding claims.

* * * * *